United States Patent [19]

Obayashi

[11] E Patent Number: Re. 33,288

[45] Reissued Date of Patent: Aug. 7, 1990

[54] AUTOMATIC LAMINATOR

[75] Inventor: Toshio Obayashi, Tokyo, Japan

[73] Assignee: Somar Corporation, Japan

[21] Appl. No.: 186,408

[22] Filed: Apr. 26, 1988

Related U.S. Patent Documents

Reissue of:

[64] Patent No.: 4,585,509
Issued: Apr. 29, 1986
Appl. No.: 655,840
Filed: Sep. 28, 1984

[30] Foreign Application Priority Data

Sep. 29, 1983 [JP] Japan ..... 58-179275

[51] Int. Cl.[5] ..... B32B 31/10

[52] U.S. Cl. ..... 156/497; 156/511; 156/517; 156/521; 156/522; 156/555; 156/556

[58] Field of Search ..... 156/497, 511, 516, 517, 156/519, 520, 521, 522, 549, 552, 555, 556, 580, 582, 583.1, 583.5, 583.6, 486, 489, 490

[56] References Cited

U.S. PATENT DOCUMENTS

| | | | |
|---|---|---|---|
| 3,623,933 | 11/1971 | Staats | 156/555 |
| 3,658,629 | 4/1972 | Cramer et al. | 156/555 |
| 4,025,380 | 5/1977 | Bernardo | 156/497 |
| 4,387,000 | 6/1983 | Tancredi | 156/555 |
| 4,491,492 | 1/1985 | Hetherington | 156/521 |
| 4,519,865 | 5/1985 | Bradler et al. | 156/521 |

*Primary Examiner*—Caleb Weston
*Attorney, Agent, or Firm*—Sughrue, Mion, Zinn, Macpeak & Seas

[57] ABSTRACT

An automatic laminator such as may be used for depositing layers of photoresist material on both sides of a base panel in which movement of the base panel during the laminating operation is continuous and overheating of the photoresist film layers is prevented. On each side of the inlet to a nip between a pair of heated rolls there is provided a main vacuum bail for holding the leading end of a web of photoresist film, and a secondary vacuum bail for pulling the leading end of the web are around arcuate end of the main vacuum bail. A first air cylinder which moves the main vacuum bail in a direction perpendicular to the plane of the base panel is itself movable in the same direction by a second air cylinder which also carries a third air cylinder, the latter moving the secondary vacuum bail in a direction parallel to the plane of the base panel. A nozzle plate is disposed opposed to the inlet of the heated rolls to cause the leading end of the web to be deposited smoothly onto the base panel.

19 Claims, 2 Drawing Sheets

AUTOMATIC LAMINATOR

Matter enclosed in heavy brackets [ ] appears in the original patent but forms no part of this reissue specification; matter printed in italics indicates the additions made by reissue.

BACKGROUND OF THE INVENTION

The invention pertains to an automatic laminator for cutting segments from a continuous web and automatically laminating those segments onto one or both sides of a relatively rigid base plate. An automatic laminator of this type can be used, for instance, in laminating photoresist material onto panels.

U.S. Pat. No. 4,025,380 discloses a laminator of the same general type to which the invention pertains. In this laminator, webs are fed from two directions to laminate both sides of base panels. Lengths of each web are fed onto a corresponding vacuum bail, and the vacuum bail is rotated to apply the web segment held thereby onto a corresponding side of the base panel. Then, a pair of heated rollers are pressed into contact with the panel carrying the web segments to press seal the web segments to the base panel.

However, this laminator is disadvantageous in that it is necessary to stop the movement of the panel at the time the heated rolls are engaged therewith. This reduces the flow rate through the laminator. Another problem is that the photoresist material may be adversely affected by the heat from the heated rolls during this time.

SUMMARY OF THE INVENTION

Accordingly, it is an object of the present invention to provide an automatic laminator in which the drawbacks of the prior art laminator discussed above are eliminated.

More specifically, it is an object of the present invention to provide an automatic laminator in which the movement of the panels through the laminator is continuous, thereby improving the flow rate of panels and reducing the danger of damage by transmission of heat from the heated rolls to the photoresist material.

These, as well as other objects of the invention, are met by an automatic laminator for deposing segments cut from a web onto a base panel, comprising a main vacuum bail having a surface extending parallel to a conveying direction of said web and perpendicular to a conveying direction of said base panel for selectively holding a portion of the web, a secondary vacuum bail disposed generally between the main vacuum bail and the base panel for positioning a leading end of the web at an end of the main vacuum bail closest to the base panel, first moving means for moving the main vacuum bail in a direction perpendicular to the base panel, second moving means for moving the secondary vacuum bail in a direction parallel to the base plate, third moving means for moving both the first moving means and the second moving means in the direction perpendicular to the base panel, a pair of heated rolls for press sealing a segment of the web to the base plate, and a nozzle plate disposed adjacent an inlet to a nip formed by the heated rolls for guiding the web segment onto the base plate.

DESCRIPTION OF THE PREFERRED EMBODIMENTS

A preferred embodiment of the invention will now be described with reference to FIGS. 1 and 2 of the accompanying drawings.

Figure 1:
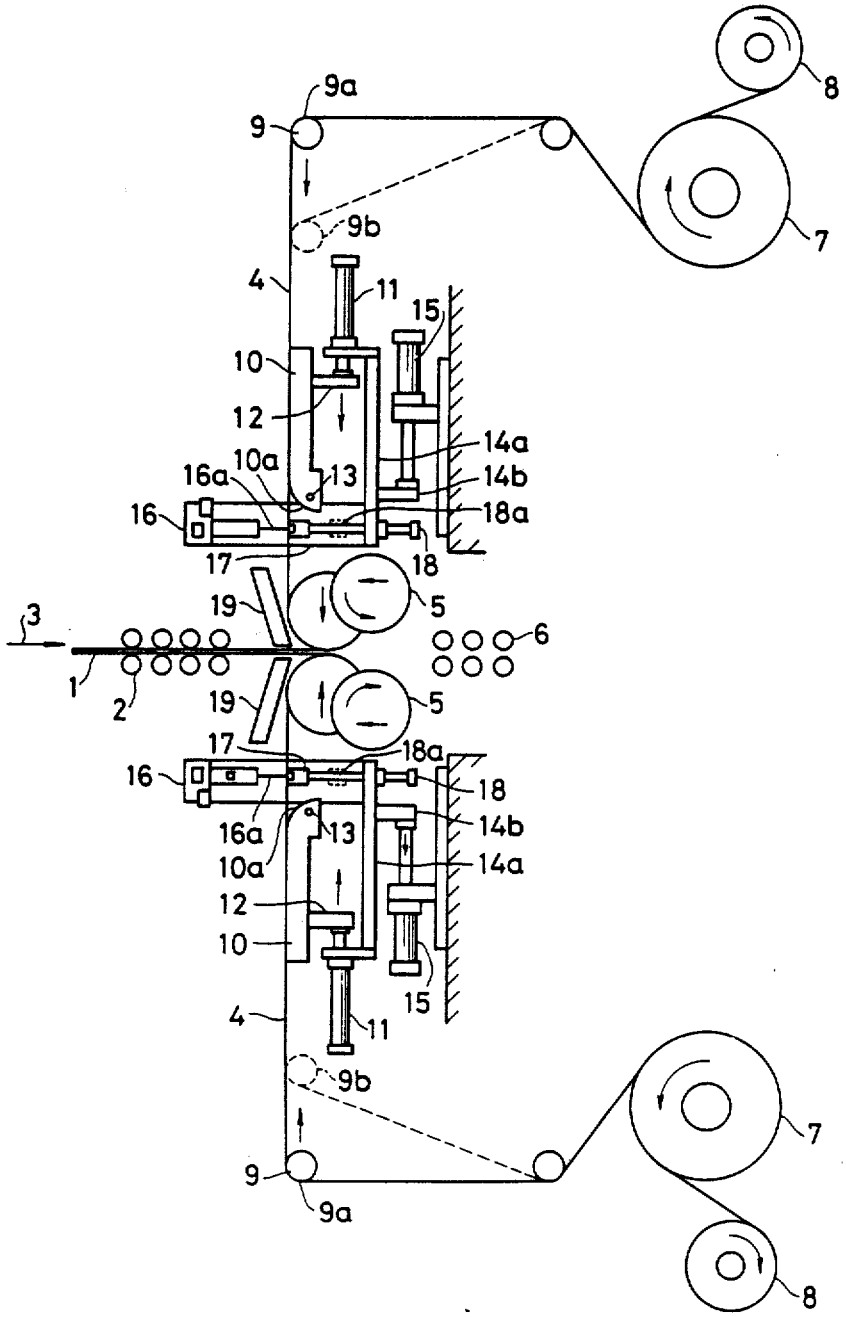
FIG. 1 is a side view of an automatic laminator constructed in accordance with the invention.

FIG. 1 is a schematic side view showing a preferred embodiment of a laminator of the invention. In this laminator, a base panel 1 having a typical thickness of about 1.6 mm, is conveyed by feed rolls 2 on the inlet side of the device in the direction indicated by an arrow 3. Mechanisms for cutting and applying web segments to both sides of the panel 1 are provided both above and below the position of the panel 1 as it enters the laminator. However, since these are identical in structure, only one will be described, specifically, the upper one of the two.

In the embodiment being described, the web 4 is supplied from rolls 7 in the form of a three-layer structure, namely, a polyethylene layer, a polyethyleneterphthalate layer, and a photoresist film layer disposed between the aforementioned two layers. The polyethylene layer, which acts as a protective layer when the photoresist web is wound on the roll 7, is stripped away by a take-up roll 8.

The tension of the segment of the web 4 fed for each base panel 1 is controlled by a dancing roll 9. The dancing roll 9 is movable vertically from an upper position 9a to a lower position 9b.

A main vacuum bail 10 is disposed below the roll 9. The main vacuum bail 10 is a hollow member having holes therein on the side against which the web 4 is held and a hollow interior selectively communicatable with a vacuum pressure source. The main vacuum bail 10 is movable vertically by a first air cylinder 11 by a connecting member 12. A heater 13 is provided in the lower end 10a of the main vacuum bail 10. The lower end 10a of the main vacuum bail 10 is arcuate as shown in FIG. 1.

The body of the first air cylinder 11 is coupled by connecting members 14a and 14b to the operating rod of a second air cylinder 15 so that the first air cylinder 11 and the main vacuum bail 10 can be moved up and down by operation of the second air cylinder 15. The body of the second air cylinder 15 is fixed to a stationary frame or the like. Further connected to the operating rod of the second air cylinder 15 by the connecting members 14a and 14b is the body of a third air cylinder 18. The operating rod 18a of the third air cylinder 18 carries at its end a secondary vacuum bail 17. The end of a carrier blade 16a of a rotary cutter device 16, also mounted on the connecting member 14a opposes the end surface of the secondary vacuum bail 17 into which it can be received to cut the web 4.

A nozzle plate 19 is provided adjacent the entry to the nip between the heated rolls 5. The purpose of the nozzle plate 19 is to provide a small air flow so as to eliminate wrinkles in the web segment before it passes into the nip between the heated rollers 5 to thereby ensure that the web segment is properly fitted to the base panel 1.

Figure 2:
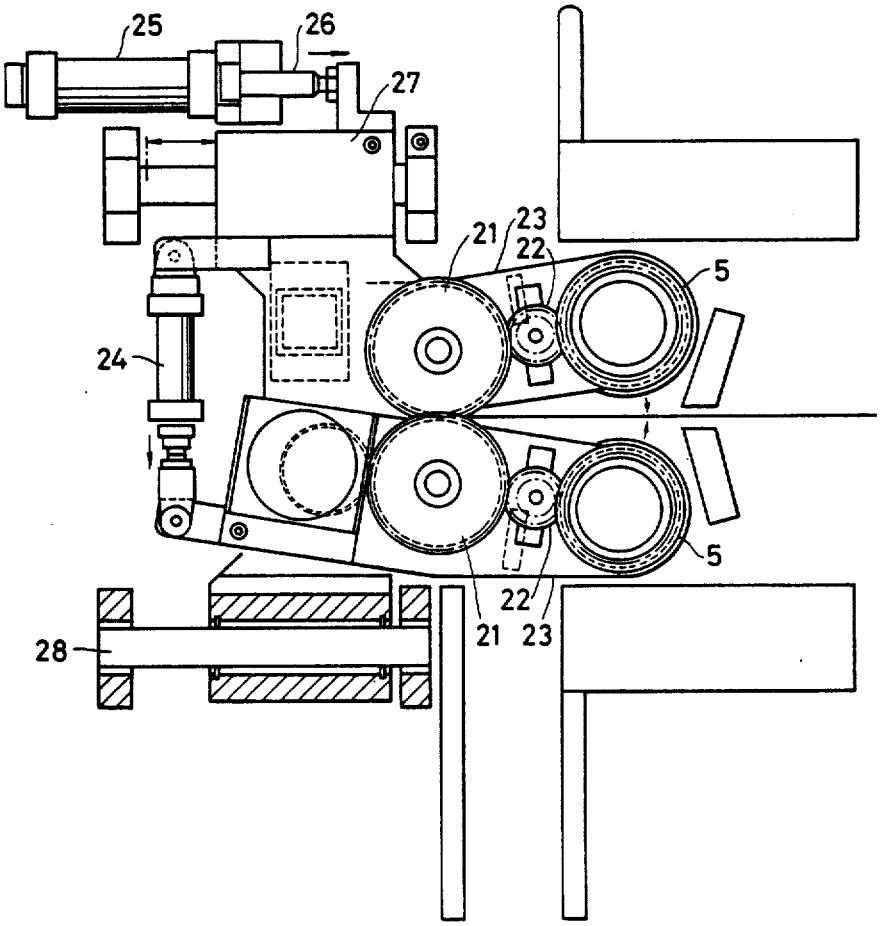
FIG. 2 is an enlarged side view, partially in cross section, showing a driving structure for the heated rolls used in the laminator of FIG. 1.

FIG. 2 is a side view, partially in cross section, showing an example of the drive arrangement for the heated rolls 5. The heated rolls 5 are mounted on corresponding frames 23 and are rotatably driven by respective transmission gears 21 via intermediate gears 22. The tow frames 23 are pivotable by a hydraulic cylinder 24 around the rotary shafts of the gears 21 to thereby adjust the distance between the opposed heated rolls 5. This assembly is coupled via a link 27 to the operating rod 26 of a hydraulic cylinder 25 so as to be movable parallel to the direction in which the base plate is conveyed. Reference numeral 28 in FIG. 2 designates a guide member.

The operation of the above-mentioned laminator will now be discussed. As above, only the components arranged above the base panels will be discussed; the components disposed below the base panel operate in the exactly same manner.

In extracting the web 4 from the roll 7, the polyethylene layer is stripped away to the take-up roll 8. To start the operation of the device, the leading end of the web 4 is manually pulled around the roller 9 to the lower end 10a of the main vacuum bail 10, that is, the leading end is aligned with the position of the cutter blade 16a.

When a base panel 1 has been conveyed by the conveyor rolls 2 to a predetermined position, the interior of the secondary vacuum bail 17 is communicated with the vacuum source so that the leading end of the web 4 is held thereby. The secondary vacuum bail 17 is then moved rearwardly by operation of the third air cylinder 18 so that the leading end of the web is pulled around the arcuate surface of the lower end 10a of the main vacuum bail 10, to which a vacuum pressure is also applied. The roll 9 is then lowered from the position 9a to the position 9b to slacken the web in an amount corresponding to the desired length of the segment to be cut therefrom. The first air cylinder 11 is then operated to lower the web carried on the arcuate end 10a of the main vacuum bail 10 to the base panel 1 while preliminarily heating the end portion of the web. This forces the end of the web onto the surface of the base panel 1.

After this operation, the vacuum pressure applied to the interior of the vacuum bail 10 is suspended to thereby free the web from the main vacuum bail 10. The first air cylinder 11 is then operated to raise the main vacuum bail 10 upwardly away from the base panel 1. Simultaneously with this action, the second air cylinder 15 is operated to move the rotary cutter device 16, the secondary vacuum bail 17 and the connecting member 14a upwardly and away from the base panel 1.

The heated rolls 5 are then moved together to nip the base panel 1 onto which the leading end of the web segment has been deposited as described above. Then, while the bas panel 1 is conveyed through the heated rollers 5, the heated rollers 5 press seal the web segment to the surface of the base panel 1. This is performed while the main vacuum bail 10 is moved upwardly away from the base panel 1 at a certain distance with the vacuum pressure removed therefrom. Moreover, the secondary vacuum bail 17 is at that time returned to its original position as shown in FIG. 1 that is, so its position opposed to the cutter blade 16a. The roller 9 is also returned to its original position 9a.

After a predetermined length of the web 4 has been pulled by operation of the heated rolls 5, the second air cylinder 15 is actuated to lower the assembly composed of the first air cylinder 11, the main vacuum bail 10, the third air cylinder 18, the secondary vacuum bail 17 and the rotary cutter assembly 16 close to the base panel 1. Then, vacuum pressure is again applied to the main vacuum bail 10 and the secondary vacuum bail 17 to thereby again retain the film thereat. Next, the blade 16a of the rotary cutter assembly 16 is operated by moving it perpendicularly to the web surface. By making the stroke speed of the second air cylinder 15 somewhat faster than the speed of the web (as determined by the rotary speed of the heated rolls 5) the film is maintained in a slackened condition. During this time, air is blown from the nozzle plates 19 against the heated rolls 5 to ensure that the web segment is smoothly deposited onto the surface of the base panel 1. The pressure flow rate and orientation of the nozzle plates 19 should be selected so that this occurs.

After the base panel 1 has passed through the nip between the heated rolls 5, the heated rolls 5 are moved apart from one another, and the first, second and third air cylinders are moved back to their initial positions designated in FIG. 1 for performing a subsequent operation.

Various modifications of the laminate device may be contemplated. For instance, the vertically movable roll 9 may be replaced by any device which performs a suitable web tensioning action. Moreover, the first, second and third air cylinders may be replaced by hydraulic cylinders. Still further, the form of the end 10a of the main vacuum bail 10 is not limited to that shown in the drawing, and it may take any form so long as it is capable of properly holding the leading end of the film and transferring it to the base panel.

This completes the description of the preferred embodiments of the invention. Although preferred embodiments have been described, it is believed that numerous modifications and alterations thereto would be apparent to one of ordinary skill in the art without departing from the spirit and scope of the invention.

I claim:

1. An automatic laminate for depositing segments cut from a web onto a base panel, comprising:

a main vacuum bail having a first surface extending parallel to a conveying direction of said web and perpendicular to a conveying direction of said base panel for selectively holding a portion of said web;

a secondary vacuum bail disposed generally between said main vacuum bail and said base panel for positioning a leading end of said web at an end of said main vacuum bail which is closest to said base panel;

first moving means for moving said main vacuum bail in a direction perpendicular to said base panel;

second moving means for moving said secondary vacuum bail in a direction parallel to said base panel;

third moving means for moving both said first moving means and said second moving means in said direction perpendicular to said base panel;

a pair of heated rolls for press sealing a segment of said web to said base panel; and a nozzle plate disposed adjacent an inlet to a nip formed by said heated rolls for guiding said web segment onto said base panel.

2. The automatic laminator of claim 1, further comprising:

means for rotatably driving said heated rolls; and means for adjusting a distance between said heated rolls.

3. The automatic laminator according to claim 2, wherein said means for adjusting said distance between said heated rolls comprises a pair of frames on which respective ones of said heated rolls are mounted, means for pivotally mounting each of said frames, and a hydraulic cylinder extending between said frames.

4. The automatic laminator of claim 1, wherein said nozzle plate is directed and an air flow rate and a pressure of air flowing through said nozzle plate are set so that said segment of said web is smoothly attached to said base panel.

5. The automatic laminator of claim 1, wherein said third moving means comprises means for moving said main vacuum bail and said secondary vacuum bail towards said base panel at a speed faster than a speed at which said base panel is conveyed by said heated rolls.

6. The automatic laminator of claim 1, further comprising heater means positioned on said main vacuum bail.

7. The automatic laminator according to claim 1, wherein said end of said main vacuum bail closest to said base panel is arcuate in cross section.

8. The automatic laminator of claim 1, further comprising cutting means for cutting said web, said cutting means being opposed to said secondary vacuum bail.

9. The automatic laminator of claim 8, wherein said third moving means moves said first moving means, said second moving means and said cutting means as a unit toward and away from said base panel.

*10. An automatic laminator for depositing a web onto a base panel, comprising:*

*rotatable rolls disposed on either side of said base panel;*

*means for supporting said rolls and for translating said rolls both horizontally and vertically with respect to said base panel to allow said rolls to clamp said base panel and a leading end of said web;*

*means for driving said rolls to press-seal said web to said base panel; and*

*said supporting means including means for removing said rolls from said base panel upon completion of said press sealing operation.*

*11. The automatic laminator of claim 10, wherein said rolls comprise heated rollers.*

*12. An automatic laminator as claimed in claim 10, further comprising means for severing said web to form web segments for application to said base panel.*

*13. An automatic laminator as claimed in claim 10, wherein said supporting means comprises a pair of frames on which respective ones of said rolls are mounted, means for pivotally mounting each of said frames, and a hydraulic cylinder connected to at least one of said frames for actuating pivotal movement of said frames.*

*14. An automatic laminator as claimed in claim 13, wherein each of said frames supports a transmission gear disposed on a rotary shaft, an intermediate gear in mesh with said transmission gear, and gear means associated with said roll and in mesh with said intermediate gear, such that said rolls are rotatably driven by said transmission gears via said intermediate gears.*

*15. An automatic laminator as claimed in claim 14, wherein said transmission gears of said respective frames are engaged with each other, and wherein said rotary shafts comprise pivot points for said respective frames.*

*16. An automatic laminator as claimed in claim 15, wherein said hydraulic cylinder, when actuated, causes said frames to pivot about said pivot points to thereby translate said rotatable rolls.*

*17. An automatic laminator for depositing segments cut from a web onto a base panel, comprising:*

*a main vacuum bail having a surface extending parallel to a conveyance direction of said web and perpendicular to a conveyance direction of said base panel, for selectively holding a portion of said web,*

*an auxiliary vacuum bail disposed generally between said main vacuum bail and said base panel for positioning a leading end of said web at the end of said main vacuum bail closest to said base panel,*

*first moving means for moving said main vacuum bail in a direction perpendicular to said base panel,*

*roll means for press-sealing a segment of said web to said base panel,*

*second moving means for moving said auxiliary vacuum bail in a direction parallel to said base panel, third moving means for moving both said first moving means and said second moving means in said direction perpendicular to said base panel,*

*press-sealing means for moving said roll means so as to approach a leading end of said base panel and clamp said base panel between adjacent rolls of said roll means after attachment of a leading end of a segment of said web to said base panel, and*

*said press sealing means including roll returning means for removing said rolls from said base panel upon completion of press-sealing said segment onto said base panel.*

*18. The automatic laminator of claim 10, further comprising:*

*a main vacuum bail having a first surface extending parallel to a conveying direction of said web and perpendicular to a conveying direction of said base panel for selectively holding a portion of said web, an end of said main vacuum bail closest to said base panel being arcuate in cross section;*

*a secondary vacuum bail disposed generally between said main vacuum bail and said base panel for positioning a leading end of said web at said end of said main vacuum bail which is closest to said base panel; and*

*means for moving said secondary vacuum bail rearwardly in a direction parallel to said base panel so that a leading end of said web is pulled around said arcuate surface of a lower end of said main vacuum bail.*

*19. The automatic laminator of claim 18, further comprising:*

*cutting means for cutting said web, said cutting means being opposed to said secondary vacuum bail; and*

*means for moving said main vacuum bail and said cutting means as a unit toward said base panel to cut said web.*

* * * * *